(12) United States Patent
Austin et al.

(10) Patent No.: US 8,573,694 B2
(45) Date of Patent: Nov. 5, 2013

(54) METHOD AND APPARATUS FOR COUPLING ISOFIX BAR TO BRACKETS THAT MOUNT TO VEHICLE BODY

(75) Inventors: Donald M. Austin, Perkinsfield (CA); Andrew R. McIntyre, Midland (CA)

(73) Assignee: M & C Corporation, Sterling Heights, MI (US)

( * ) Notice: Subject to any disclaimer, the term of this patent is extended or adjusted under 35 U.S.C. 154(b) by 1327 days.

(21) Appl. No.: 11/285,539

(22) Filed: Nov. 22, 2005

(65) Prior Publication Data

US 2007/0114826 A1    May 24, 2007

(51) Int. Cl.
A47D 1/10    (2006.01)
B60R 21/00    (2006.01)

(52) U.S. Cl.
USPC .................. 297/253; 297/250.1; 297/216.11

(58) Field of Classification Search
USPC ................... 297/253, 250.1, 216.11
See application file for complete search history.

(56) References Cited

U.S. PATENT DOCUMENTS

| | | | |
|---|---|---|---|
| 4,961,504 A * | 10/1990 | Larson | 211/59.1 |
| 6,082,818 A | 7/2000 | Muller et al. | |
| 6,234,572 B1 | 5/2001 | Shiino et al. | |
| 6,276,754 B1 * | 8/2001 | Youssef-Agha et al. | 297/253 |
| 6,604,793 B2 * | 8/2003 | Habedank | 297/463.1 |
| 6,634,710 B1 * | 10/2003 | Adamson et al. | 297/253 |
| 7,410,215 B2 * | 8/2008 | Dehli | 297/300.3 |
| 7,484,336 B2 * | 2/2009 | Stone | 52/156 |
| 2004/0051356 A1 * | 3/2004 | Neelis | 297/253 |
| 2004/0080193 A1 | 4/2004 | Tong et al. | |
| 2004/0080194 A1 | 4/2004 | Medvecky et al. | |
| 2004/0080195 A1 | 4/2004 | Adams et al. | |
| 2004/0227384 A1 * | 11/2004 | Smallwood et al. | 297/253 |
| 2004/0261246 A1 | 12/2004 | Duffy et al. | |
| 2005/0168024 A1 * | 8/2005 | Duffy et al. | 297/253 |

FOREIGN PATENT DOCUMENTS

CA    1043834    12/1978

OTHER PUBLICATIONS

International Search Report dated Jan. 22, 2008 in corresponding PCT application.

* cited by examiner

*Primary Examiner* — Sarah B McPartlin
(74) *Attorney, Agent, or Firm* — Brooks Kushman P.C.

(57) ABSTRACT

A method and apparatus for assembling restraint anchorage for use in child seat restraint anchorage by forming a portion of a bracket to engage a tubular rail that supports a plurality of latch wires. A portion of the bracket extends longitudinally along the tube. The extended portion is connected to the tube by mechanical engagement, preferably with a fastener. In a preferred embodiment, the fastener is formed by portions of the latch wire by cold heading shoulders on leg portions of the latch wires.

15 Claims, 2 Drawing Sheets

US 8,573,694 B2

METHOD AND APPARATUS FOR COUPLING ISOFIX BAR TO BRACKETS THAT MOUNT TO VEHICLE BODY

BACKGROUND OF THE INVENTION

1. Field of the Invention

A method and apparatus for coupling an Isofix bar to a bracket in a regulated child seat restraint anchorage forms a recess on the bracket to at least partially receive the Isofix bar and a bracket portion extending along the bar is mechanically joined to the bar.

2. Background Art

Vehicles are now required to have lower anchorages for child seats as described in Federal Motor Vehicle Safety Standard 225. These anchorages usually include a plurality of latch wires, often positioned in pairs for latching to the couplers of a child seat. When the latch wires are attached to an anchor including a single, elongated tube, which is attached to the vehicle via mounting brackets, the assembly was commonly referred to as an Isofix bar.

The mounting bracket to tube attachment is usually accomplished by means of a welding process. The welding process subjecting the Isofix bar to heat can distort the assembly, affect the appearance and finish surfaces of the assembly and can cause undesirable warping of the tube, resulting in an inconsistent product. Another drawback to the welding process is that if the brackets are positioned in such a way that there is a gap between the bracket and the tube, the joint between the bracket and the tube can be considerably weakened due to poor weld penetration. Some existing brackets were designed to encapsulate the tube to reduce inconsistency in the gap between the bracket and the tube, to allow for a more consistent welding process. Nevertheless, while strengthening the connection, the other disadvantages of welding remain.

SUMMARY OF THE INVENTION

The present invention overcomes the above-identified problems by reducing the need for welding, if not eliminating welding completely in anchorage structure for child seat restraint, in the attachment of the Isofix bar to a mounting bracket by at least partially encompassing the tube within a bracket recess or channel, and extending a portion of the bracket along the tube adjacent the recess. Preferably, the extended portion is mechanically locked, preferably by a fastener, to the tube.

In one embodiment, the bracket has a recess that partially or fully encapsulates the tube, and a tab formed on the bracket allows the bracket to be riveted to the tube. A flange, particularly an encompassing flange, may be extruded from the bracket to form the extending portion to allow for riveting. Other embodiments of the extended portions use a flange formed at the edge of the bracket to allow for riveting, but the bracket does not fully encapsulate the tube.

The embodiments may be used as a sole method to attach the brackets to the tube. Such a structure eliminates the welding process and related problems of positioning, alignment, uneven gap, tube warping or finishing that occur from intense application of heating during welding. Nevertheless, the embodiments provide an accurate method of positioning brackets relative to the tube, and securing the Isofix bar to the brackets and permitting anchorage to the vehicle frame as desired. When used in conjunction with a welding process, that provides additional strength to the bracket to tube joint, the limited heating reduces distortion. The combination of recess and extended portion eliminates positioning problems, weak gap structures, even where the recess or the extending portions are not exactly corresponding to the shape or size of the tube associated with the welding process.

BRIEF DESCRIPTION OF THE DRAWING

The present invention will be more readily understood by reference to the following detailed description of preferred embodiments when read in conjunction with the accompanying drawing, in which like reference numerals refer to like parts throughout the views and in which.

DETAILED DESCRIPTION OF THE PREFERRED EMBODIMENT(S)

Figure 1:
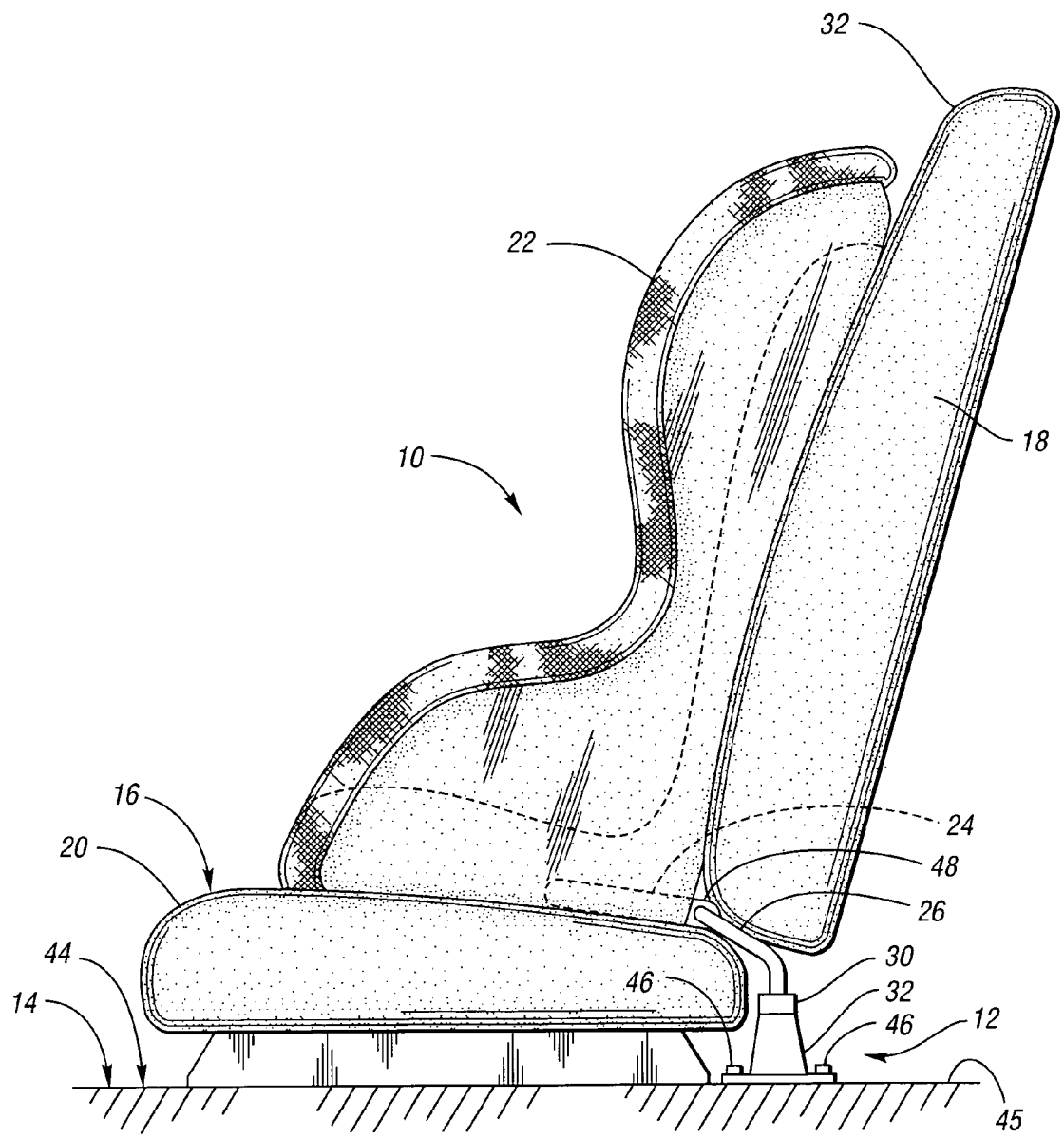
FIG. 1 is a side elevational view of a child seat carried in a vehicle seat with couplers for mounting to latch wires mounted to an anchorage constructed according to the present invention.

Referring first to FIG. 1, the child restraint seat system 10 includes a restraint anchorage 12 inside a vehicle passenger compartment 14. The passenger compartment 14 contains vehicle seat 16 having an upper back portion 18 and a lower portion 20. A child restraint seat 22 is secured upon the seat 16 and then coupled in position by couplers 24 that engage a latch wire 26. Latch wire 26 is positioned and supported by the anchorage 12. Positioning and performance of the latch wires is governed by the Federal Motor Vehicle Safety Standards (FMVSS) regulations.

The restraint anchorage 12 often employs an elongated rail 30 secured by support brackets 32 to the vehicle framing 44 such as floor 45. In order to meet the strength requirements established by the regulations, rails 30 are often welded to brackets 32, and a plurality of latch wires 26 are secured to the rail 30, for example by welding. In addition, the brackets 32 may be mounted to the vehicle framing 44 such as flooring, structural beams, or a seat frame, by welding, fasteners 46 or the like. Nevertheless, previous constructions that rely upon welding can cause problems of appearance, finish coating, positioning, alignment and uncontrolled distortion in components which have been subjected to the high temperatures typically encountered in welding operations.

Referring now to FIGS. 2-6, the present invention includes embodiments that improve construction of restraint anchorages 12 by addressing the manner in which a rail 30 may be secured to brackets 32. Preferably, the embodiments eliminate the need for, if not the use of, welding in that assembly. As a result the alignment of the parts remains unaffected by the application of heat to the tube and the brackets, and the brackets may be bolted to the vehicle frame as well. In addition, both parts may be finished or coated, before or after assembly, or as desired without disruption by the assembly process. The embodiments meet the stringent strength requirements or restraint anchorages defined in the regulations.

Figure 2:
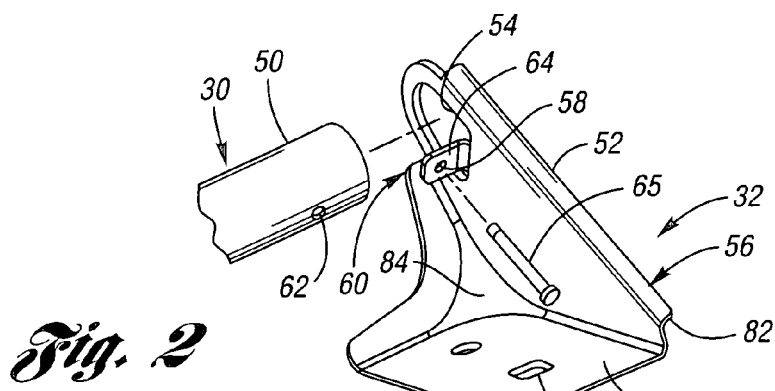
FIG. 2 is an exploded, perspective view of a bracket and tube assembly constructed in accordance with the present invention to form a child seat restraint anchorage in accordance with the present invention.

As shown in FIG. 2, the hollow tube 50 is received in aperture 54 in a flange 52. Adjacent to the aperture 54, a flange 64 extends outwardly along the tube 50 at the periphery of the opening 54 to form an extending portion 60 of the bracket that can be mechanically joined with the tube. In the preferred embodiment, such mechanical joinder may be accomplished by rivets, although other fasteners or bonding may physically join the parts. Preferably, the tube 50 and the flange 64 include apertures 62 and 58, respectively, that may be aligned in a predetermined position so that they may be registered for receiving the rivet 65 and aligning the bracket along the tube 50 in a desired mounting location. The bracket 56 also includes a mounting flange 66, preferably formed by stamping that engages the frame 44. The flange 66 may be provided with positioned fastener openings, for example, as shown at 67, to permit the flange to be secured to the frame 44 at a predetermined location. Likewise rivets, bolts, welding or other securing may be practiced to mount the restraint anchorage bracket 32 of the present invention to the vehicle frame.

Figure 3:
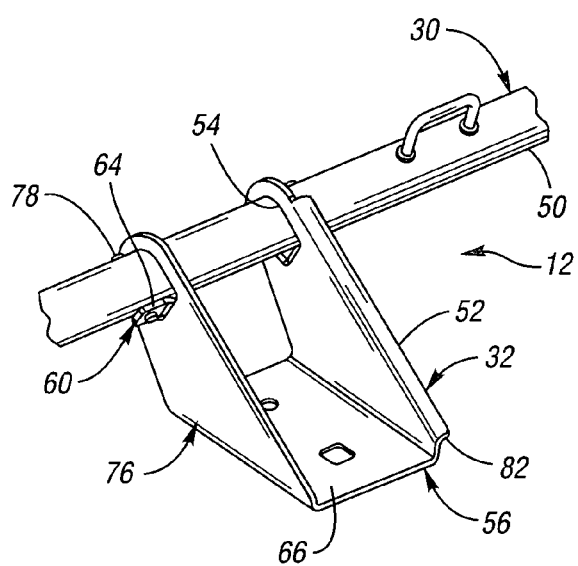
FIG. 3 is a perspective view similar to FIG. 2 but showing modified features of the structure.

Referring now to FIG. 3, the bracket 32 is formed as a stamping 76 that includes two flanges like the flange 52 of FIG. 2. The two flanges 52 extend on either side of the mounting flange 66. Moreover each side flange 52 includes a recess 53 in the form of enclosed aperture 54. Similarly, each flange 52 includes an extending portion 60 in the form of a flange 64 that permits anchoring of the tube 50 to bracket 76. An additional aperture 62 may be formed in the diametrically opposed portion of the tube 50 from the first aperture 62 so that a rivet 78 extending across the tube may mount the tube 50 to the bracket 76. In addition, the diametrically opposite end of the tube from opening 54 may also be engaged by a flange like 64 on bracket 56 with an aperture 58 so as to receive the rivet 78. As shown in FIGS. 2 and 3, the flanges 56 may be reinforced by additional reinforcement flanges 82 and additional support gussets 84 may couple the mounting flange 66 to the support flange 52.

Figure 4:
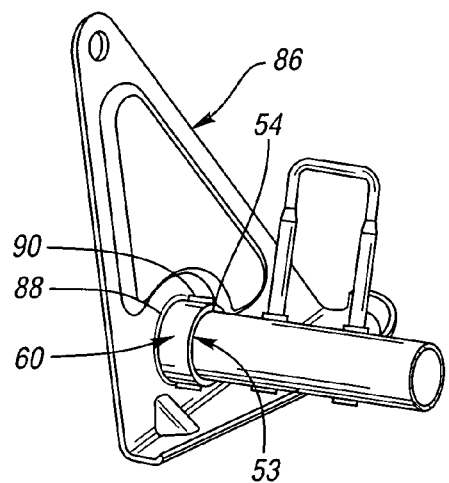
FIG. 4 is a perspective view of another modified bracket structure constructed in accordance with the present invention.

Referring to FIG. 4, a bracket 86 includes a support flange 56 having recess 53 in the form of an aperture 54. However, the extending portion 60 is in the form of a cylindrical flange 88 that, like the peripheral flange edge about the aperture 54, wholly encompasses the rail 30 therein. Registering apertures in the boss 88 and the rail 30 may be provided as discussed with respect to the embodiments shown in FIGS. 2 and 3 so that rivet 90 or other mechanical connection can be made between the rail 30 and the bracket 86.

Figure 5:
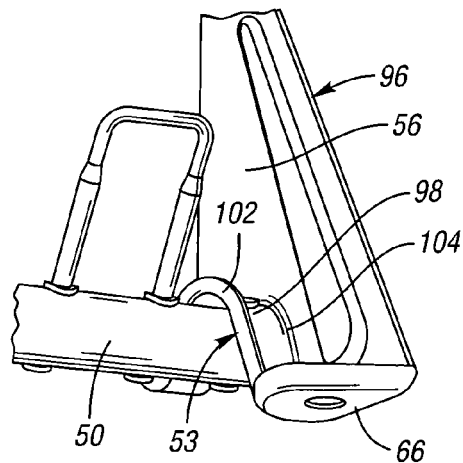
FIG. 5 is a perspective view of another modification of bracket structure constructed in accordance with the present invention.

Referring to FIG. 5, a bracket 96 is shown including the recess 53 which unlike the previous embodiments, does not wholly enclose the periphery of the tubular rail 50. Rather, the recess 53 has an open end, and a wall 98 forms a shoulder generally conforming with the periphery of tube 50 so that the recess 53 receives at least a portion of the tubular rail 50. The wall 98 includes reinforcement ridge 102 and reinforcement gusset 104 coupling the wall 98 to flange 56. Wall 98 and the flange 56 are coupled by appropriate gussets or the like to mounting the flange 66.

Figure 6:
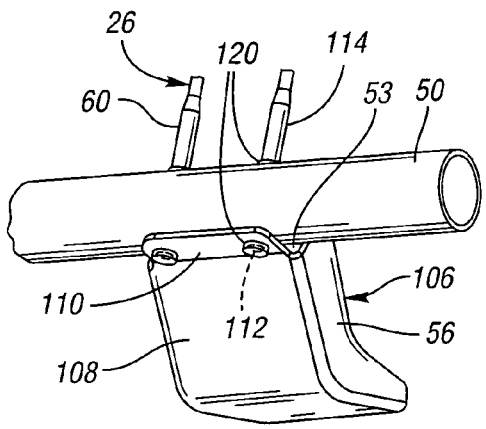
FIG. 6 is a modified bracket structure according to the present invention combining latch wire mounting with anchorage assembly in accordance with the invention.

Referring now to FIG. 6, the bracket 106 includes two support flanges 56 in which the recess 53 is formed in part by the edges of the flanges 56 and an end of a connecting flange 108 joining the side flanges 56. The connecting flange 108 includes the lip 110 that together with the flanges 56 partially encloses the tube 50 within the recess 53. The lip 110 forms the extending portion 60 extending along a peripheral portion of the tube 50. Moreover, while the lip 110 includes apertures 112 adapted to receive fasteners extending through registering apertures in the tube 50, the fasteners of this embodiment are formed by the legs 114 of the latch wire 26 extending through the tube 50 and the lip 110. The rivets are formed as shoulders 120, preferably cold formed from the leg material of the latch wires, to couple the tube 50, a latch wire 26 and a support bracket 56 in a single joining process.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A child seat restraint anchorage comprising:
   an elongated tube;
   a plurality of latch wires coupled to said tube for positioning intermediate a seat bench and a seat back;
   at least one support bracket having a channel at least partly enclosing said tube, wherein said bracket includes a portion extending longitudinally along the tube aligned with an edge of said channel; and
   a fastener mechanically joining said portion to said tube.

2. The invention as described in claim 1 wherein said channel comprises a recess and said portion comprises a flange adjacent said recess.

3. The invention as described in claim 1 wherein said channel comprises an aperture in a bracket wall.

4. The invention as described in claim 3 wherein said portion comprises a flange on said bracket wall.

5. The invention as described in claim 3 wherein said portion comprises a shoulder.

6. A method for mounting a support bracket to a child seat restraint anchorage tube having a plurality of latch wires, comprising:
   conforming a portion of said bracket to peripherally engage a portion of said tube;
   extending a portion of said bracket longitudinally and peripherally along said tube at said conforming portion to abut the tube along at least spaced areas;
   connecting said portion to the tube by mechanical engagement with a fastener.

7. The invention as described in claim 6 wherein said conforming comprises forming a recess in said bracket receiving a peripheral portion of the tube.

8. The invention as described in claim 7 wherein said conforming comprises forming an aperture dimensioned to receive the tube.

9. The invention as described in claim 7 wherein said conforming comprises forming a flange adjacent said recess.

10. The invention as described in claim 6 wherein said connecting comprises cold heading a fastener extending through said portion and said tube.

11. The invention as described in claim 10 wherein said fastener is a latch wire having at least one latch wire leg and said cold heading forms a shoulder on said latch wire leg.

12. The invention as described in claim 11 and limiting said extending with a shoulder on said at least one latch wire leg.

13. A child seat restraint anchorage comprising:
   an elongated tube;
   a plurality of latch wires coupled to said tube for positioning intermediate a seat bench and a seat back;
   at least one support bracket having a channel at least partly enclosing said tube, wherein said bracket includes a portion extending longitudinally along the tube aligned with an edge of said channel; and a fastener mechanically joining said portion to said tube, wherein said fastener comprises one of said plurality of latch wires.

14. The invention as described in claim 13 wherein said latch wire includes a formed shoulder.

15. A child seat restraint anchorage comprising:

an elongated tube;

a plurality of latch wires coupled to said tube for positioning intermediate a seat bench and a seat back;

at least one support bracket having a channel at least partly enclosing said tube, wherein said bracket includes a portion extending longitudinally along the tube aligned with an edge of said channel; and a fastener mechanically joining said portion to said tube; wherein said channel comprises an aperture in a bracket wall; wherein said portion comprises a shoulder; and wherein said shoulder generally conforms to the periphery of the tube.

* * * * *